(12) United States Patent
Sohn et al.

(10) Patent No.: US 10,902,848 B2
(45) Date of Patent: Jan. 26, 2021

(54) METHOD FOR PROVIDING TELEMATICS SERVICE USING VOICE RECOGNITION AND TELEMATICS SERVER USING THE SAME

(71) Applicant: Hyundai Autoever America, LLC, Fountain Valley, CA (US)

(72) Inventors: Changki Sohn, Fountain Valley, CA (US); Bongseok Kim, Irvine, CA (US)

(73) Assignee: HYUNDAI AUTOEVER AMERICA, LLC., Fountain Valley, CA (US)

(*) Notice: Subject to any disclaimer, the term of this patent is extended or adjusted under 35 U.S.C. 154(b) by 68 days.

(21) Appl. No.: 15/655,812

(22) Filed: Jul. 20, 2017

(65) Prior Publication Data
US 2019/0027137 A1 Jan. 24, 2019

(51) Int. Cl.
| | | |
|---|---|---|
| *G10L 15/22* | (2006.01) | |
| *G10L 17/06* | (2013.01) | |
| *G10L 15/30* | (2013.01) | |
| *H04L 29/06* | (2006.01) | |
| *H04W 12/06* | (2009.01) | |
| *G06F 21/32* | (2013.01) | |
| *G06F 3/16* | (2006.01) | |
| *H04W 4/40* | (2018.01) | |
| *G10L 15/26* | (2006.01) | |
| *G10L 17/22* | (2013.01) | |

(52) U.S. Cl.
CPC .............. *G10L 15/22* (2013.01); *G06F 3/167* (2013.01); *G06F 21/32* (2013.01); *G10L 15/26* (2013.01); *G10L 15/30* (2013.01); *G10L 17/06* (2013.01); *H04L 63/0861* (2013.01); *H04W 4/40* (2018.02); *H04W 12/06* (2013.01); *G10L 17/22* (2013.01); *G10L 2015/223* (2013.01)

(58) Field of Classification Search
CPC ......... G10L 15/22; G10L 15/08; G10L 15/00; G10L 15/26; G10L 15/265; G10L 25/48; G10L 2015/223; G06F 3/167
See application file for complete search history.

(56) References Cited

U.S. PATENT DOCUMENTS

| | | | |
|---|---|---|---|
| 2011/0046953 A1* | 2/2011 | Arun ..................... | G10L 15/187 704/255 |
| 2011/0144980 A1* | 6/2011 | Rysenga .............. | G06Q 10/109 704/201 |
| 2012/0253823 A1* | 10/2012 | Schalk ............... | G01C 21/3608 704/270.1 |
| 2013/0169410 A1* | 7/2013 | Amselem ................. | G05B 1/01 340/5.52 |

(Continued)

*Primary Examiner* — Mark Villena
(74) *Attorney, Agent, or Firm* — Xsensus LLP

(57) ABSTRACT

A method for providing a telematics service by using voice recognition is provided. The method includes steps of: (a) a telematics server, if a text command signal converted from a voice command signal for a control of a vehicle from a voice input device and a user's voice sample are acquired from a voice recognition service-providing device, analyzing the user's voice sample; and (b) the telematics server, if the user's voice sample satisfies at least one preset condition, allowing the vehicle to be controlled according to the voice command signal by supporting a telematics device placed in the vehicle to run a telematics API corresponding to the text command signal.

18 Claims, 8 Drawing Sheets

(56) References Cited

U.S. PATENT DOCUMENTS

| | | | |
|---|---|---|---|
| 2015/0056951 A1* | 2/2015 | Talwar | H04W 4/12 |
| | | | 455/411 |
| 2016/0300050 A1* | 10/2016 | Hecht | G06F 21/32 |
| 2017/0133013 A1* | 5/2017 | Tsai | G10L 15/063 |
| 2019/0057703 A1* | 2/2019 | Zeinstra | G10L 17/00 |

* cited by examiner

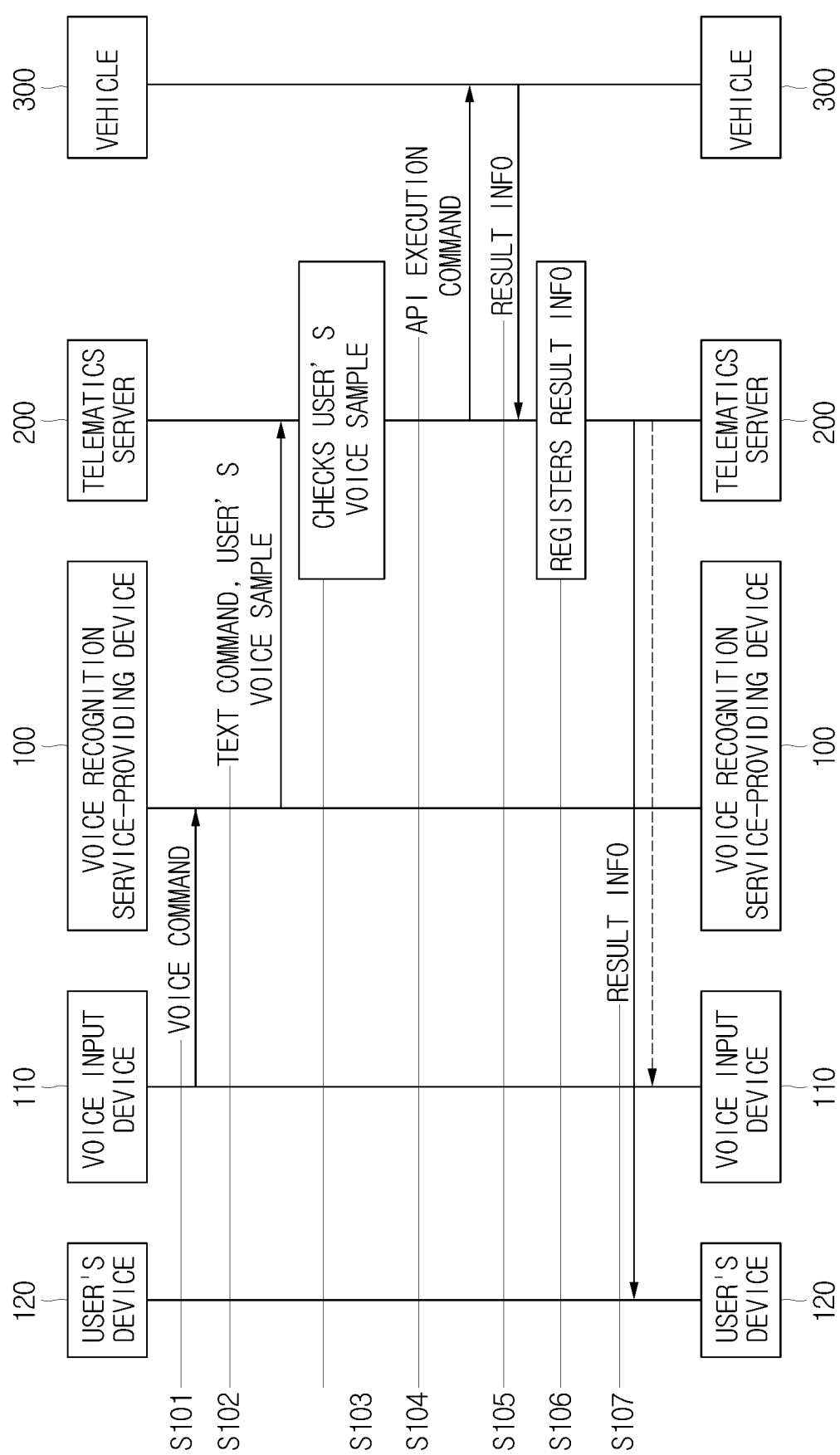

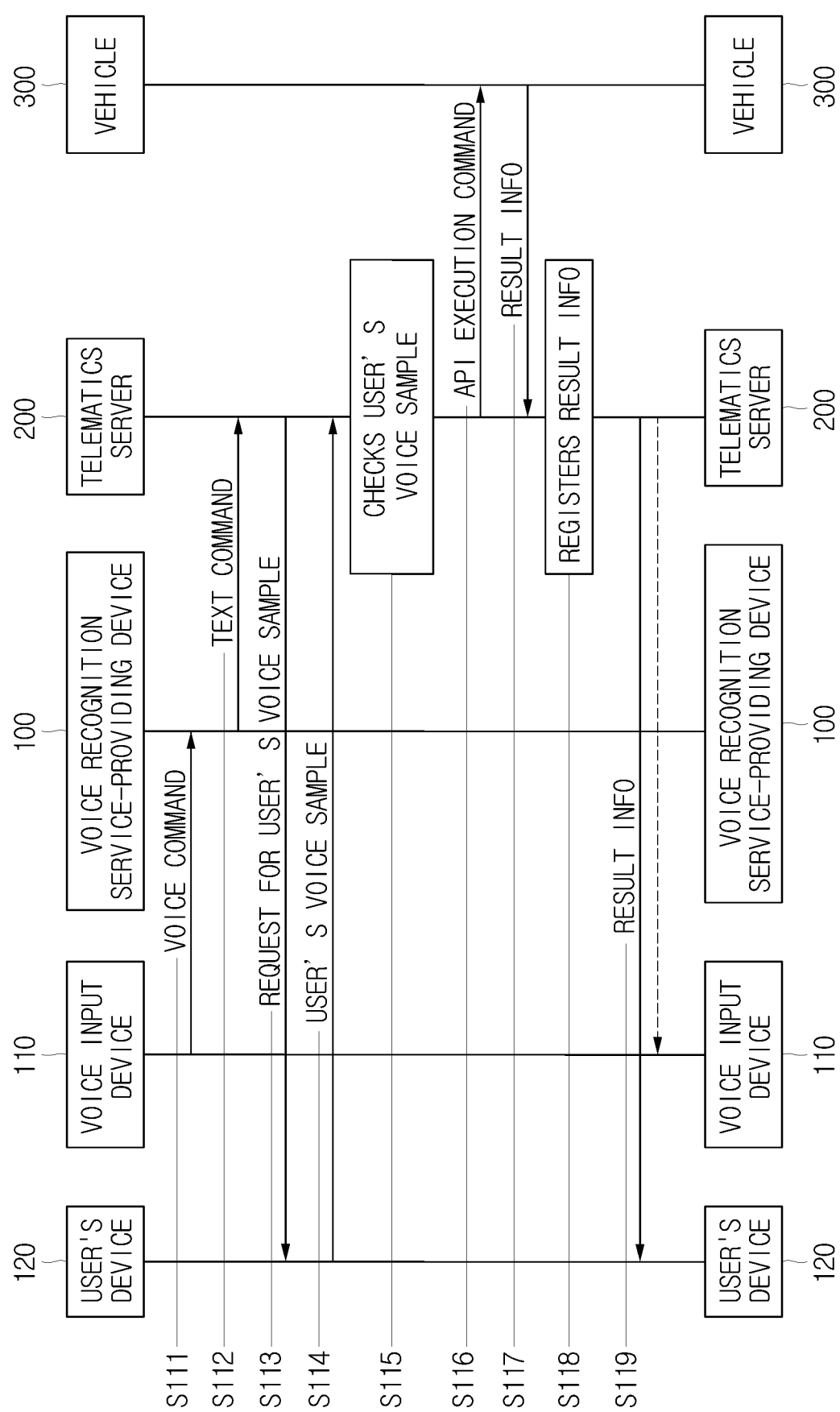

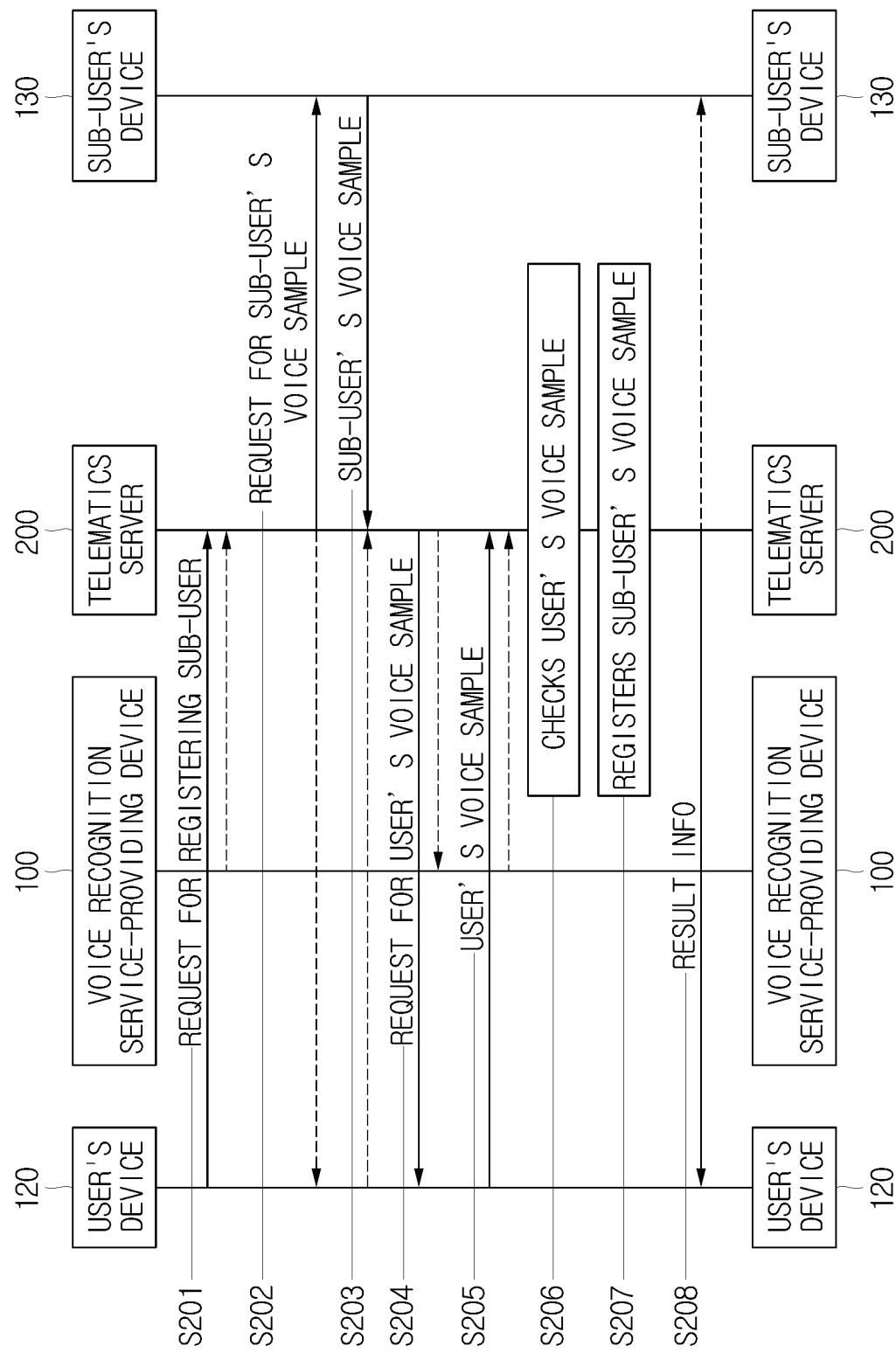

METHOD FOR PROVIDING TELEMATICS SERVICE USING VOICE RECOGNITION AND TELEMATICS SERVER USING THE SAME

FIELD OF THE INVENTION

The present invention relates to a method for providing a telematics service using voice recognition and a telematics server using the same, and more particularly, to the method for providing the telematics service using the voice recognition by (i) acquiring a text command signal converted from a voice command signal for a control of a vehicle from a voice input device and a user's voice sample from a voice recognition service-providing device, (ii) analyzing the user's voice sample, and (iii) supporting a telematics device placed in the vehicle, if the user's voice sample satisfies at least one preset condition, to run a telematics API corresponding to the text command signal, and the telematics server using the same.

BACKGROUND OF THE INVENTION

In general, a term "telematics" is a compound derived from telecommunication and informatics. Drivers may remotely diagnose their vehicles through a wireless network and use a variety of information including traffic, living, and emergency rescue information. They may make calls, or send and receive emails by voice, and also download audiobooks.

In addition, a variety of telematics services are available depending on types of services including news subscription, stock investment, e-commerce, financial transactions, hotel reservations, facsimile transmission and reception, video games, car accident and theft reports, etc.

At earlier stages, such telematics services were provided based on call centers, but they have emerged as mobile app-based telematics services according to the increase of mobile users.

In particular, thanks to the release of services in relation to IoT devices and artificial intelligence speakers and the increase in user traffics, vehicles telematics services interworking with services of voice recognition device providers, for example, Google with Google Home and Amazon with Echo & Alexa, are provided.

In case of such a telematics service linked with a voice recognition device provider, when a user inputs his or her voice command through a voice recognition device, the voice recognition device converts the voice command into texts and transmits it to a telematics service provider, who provides the telematics service according to the texts received from the voice recognition device.

However, providing such a telematics service linked with the voice recognition device provider has following problems:

First, under such a telematics service, the voice recognition device provider receives a PIN inputted by voice to confirm a user but it is impossible to confirm whether the user who has inputted the PIN by voice is an actual user. For example, if a text command converted from a PIN of a vehicle owner inputted as voice by a third party (not by the actual vehicle owner) is received, the telematics service provider only checks whether the PIN is correct, regardless of who inputted the PIN by voice, and provides the telematics service which allows the vehicle, etc. to be controlled. Therefore, problems such as the theft or fraudulent use of the vehicle, or the operation of the vehicle by an unqualified person occur.

Besides, for such a telematics service linked with a voice recognition device provider, the voice recognition device provider monopolizes a user's voice data necessary for the voice recognition and merely sends a request for the telematics service to the telematics service provider with text data converted from the user's voice data. Thus, the telematics service provider cannot check whether the actual subscriber and the service requester are identical with each other. Accordingly, it has to provide the telematics service according to the text data even at the request by the third party who is not an actual subscriber. Therefore, it has another problem that causes vulnerabilities.

Furthermore, even if a telematics service subscriber intends to entrust the authority to use the telematics service to his or her family or friend, the telematics service provider has no way of controlling the authority thereof.

SUMMARY OF THE INVENTION

It is an object of the present invention to solve all problems explained above.

It is another object of the present invention to provide a method for confirming whether a user who requested a service is an actual user of a vehicle by using a text command converted by a voice recognition device provider.

It is still another object of the present invention to provide a method for allowing a telematics service provider that provides a telematics service linked with a voice recognition device provider to authenticate a user.

It is still yet another object of the present invention to provide a method for controlling a telematics service per user and device if the telematics service being provided is linked with the voice recognition device provider.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art:

FIGS. 6 to 7 schematically show a method for providing the telematics service by using voice recognition in accordance with one example embodiment of the present invention.

FIG. 8 schematically shows a method for a user of the telematics service entrusting an authority for the telematics service to a sub-user in accordance with one example embodiment of the present invention.

DETAILED DESCRIPTION OF THE PREFERRED EMBODIMENTS

Figure 1:
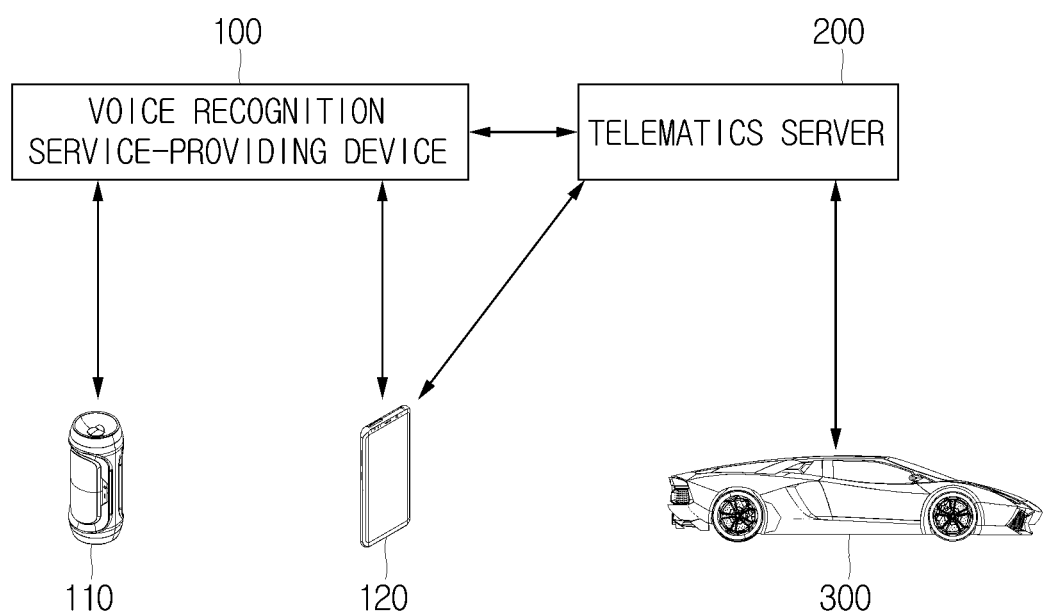
FIG. 1 schematically illustrates a system for providing a telematics service by using voice recognition in accordance with one example embodiment of the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make those skilled in the art embody the present invention easily, desirable example embodiments of the present invention will be explained more specifically by referring to drawings attached.

FIG. 1 roughly illustrates a system for providing a telematics service by using voice recognition in accordance with one example embodiment of the present invention. The system may include a voice recognition device 110, a user's device 120, a voice recognition service-providing device 100, and a telematics server 200.

First of all, the voice recognition device 110, which transmits an audio signal corresponding to a user's voice, may include a microphone, and, as the case may be, include the microphone and a speaker. Besides, the voice recognition device 110 may include a speaker for outputting the received audio signal as a voice. However, the voice recognition device 110 is not limited to this and may include all devices with a function of converting the user's voice to the audio signal and transmitting it.

In addition, the user's device 120 may include a desktop computer, a laptop computer, a tablet pc, a PDA, a smartphone, a portable device, etc. and it is not limited to these. It may include all computing devices that show users information transmitted through a communication with other devices and transmit data signals corresponding to the user's input signals to them.

Next, the voice recognition service-providing device 100 confirms the user's intention to use a telematics service from the user's voice command signal corresponding to the audio signal received from the voice recognition device 110, creates a text command signal corresponding to the confirmed user's intention, and transmits the created text command signal to the telematics server 200 to allow the telematics server 200 to provide the telematics service to the user. Herein, the voice recognition service-providing device 100 may be configured as a server which achieves desired system performance by using a combination of a computing device and computer software.

In addition, the telematics server 200 achieves desired system performance by typically using a combination of devices including the computing device, e.g., a device that may include a computer processor, a memory, a storage, an input device and an output device, and other existing computing devices' components; an electronic communication device such as a router or a switch, and an electronic information storage system such as network-attached storage (NAS) and storage area network (SAN), and computer software, i.e., instructions to allow the computing device to function in a specific manner. It provides the telematics service by using the user's voice recognition.

Figure 2:
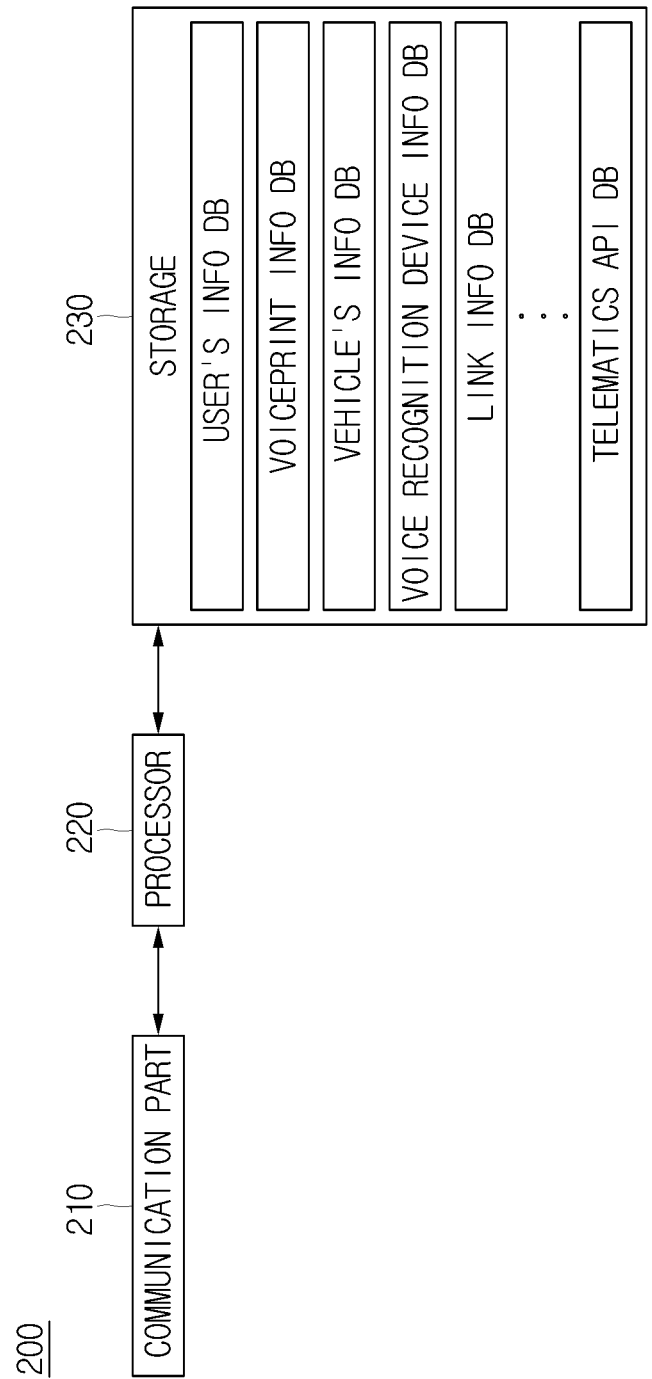
FIG. 2 schematically illustrates a telematics server for providing the telematics service by using voice recognition in accordance with one example embodiment of the present invention.

As shown in FIG. 2, the telematics server 200 may include a communication part 210, a processor 220, and storage 230.

As such, the communication part 210 of the telematics server 200 may transmit and receive a request and a response to and from other linked devices. As one example, such a request and a response may be made by an identical TCP session, but they are not limited to this. For example, they may be also transmitted or received as UDP datagrams.

In addition, the processor 220 of the telematics server 200 may include hardware configuration such as a micro processing unit (MPU), a central processing unit (CPU), a cache memory, a data bus, etc. Furthermore, it may further include software configuration including an operating system, and an application that performs a specific purpose.

The processor 220 of the telematics server 200 may acquire, from the voice recognition service-providing device 100, a user's voice sample and a text command signal converted from a voice command signal for a control of a vehicle if the voice command signal is acquired by the voice input device 110. If the user voice sample is analyzed and determined to be satisfying at least one preset condition, it may support a telematics device 300 placed in the vehicle to execute a telematics API corresponding to the text command signal. As another example, the processor 220 of the telematics server 200 may acquire, from the voice recognition service-providing device 100, the text command signal from the voice recognition service-providing device 100 converted from the voice command signal for the control of the vehicle if the voice command signal is acquired by the voice input device 110 and may acquire the user's voice sample from the user's device 120 by sending a request to the user's device 120 and then if the user's voice sample is analyzed and determined to be satisfying at least one preset condition, the processor 220 may support the telematics device 300 placed in the vehicle to execute the telematics API corresponding to the text command signal.

Next, the storage 230 of the telematics server 200 may store a program, or data necessary to operate the processor 220, or data created by the operation. Herein, the storage 230 may be built in the telematics server 200 or detachable. Alternatively, it may be installed outside the telematics server 200 and allow data to be transmitted and received through a communication with the telematics server 200.

Besides, the storage 230 may include a flash memory, a hard disk, a memory card such as SD memory card or XD memory card, random access memory (RAM), static random access memory (SRAM), read only memory (ROM), electrically erasable programmable read only memory (EEPROM), programmable read only memory (PROM), magnetic memory, magnetic disk, optical disk, etc. In addition, the storage 230 may be formed as a single medium or as multiple media.

Herein, the storage 230 may store user's information, voiceprint information, vehicle's information, voice recognition device information, link information, the telematics API, etc. and may be formed as a single or multiple database servers that store the information.

Figure 3:
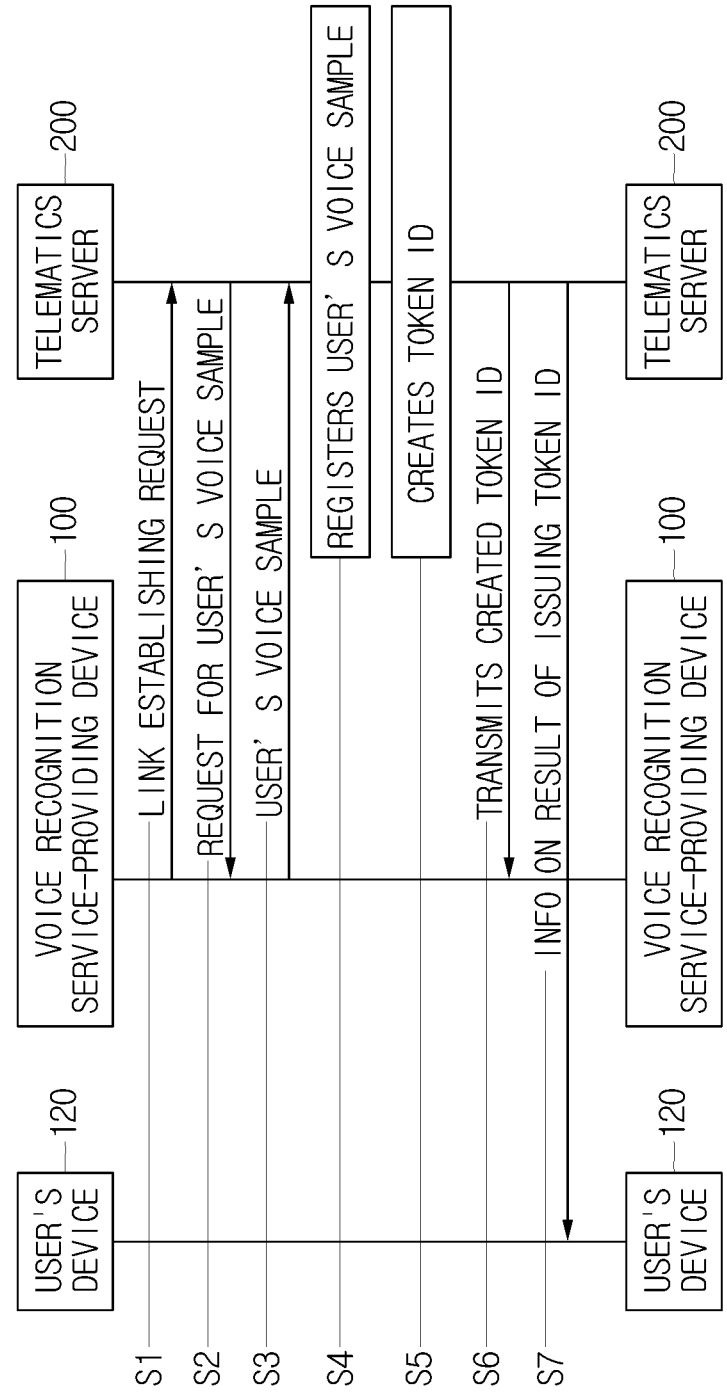
FIGS. 3 to 5 schematically illustrate a method for linking a user's accounts between a voice recognition device provider and a telematics service provider in accordance with one example embodiment of the present invention.

By referring to FIGS. 3 to 8, methods for providing telematics services by using voice recognition in accordance with various example embodiments of the present invention will be explained as follows:

First of all, by referring to FIG. 3, a method for linking a user's accounts between the voice recognition service-providing device 100 and the telematics server 200 in accordance with one example embodiment of the present invention will be explained.

To allow a user of a voice recognition service to use a telematics service, the voice recognition service-providing device 100 sends a link establishing request to the telematics server 200 to link a user's account registered with the voice recognition service device 100, i.e., a voice recognition service account, with a user's account registered with the telematics server 200, i.e., a telematics service account, at the step of S1.

Then, the telematics server 200 checks whether the telematics service account is a registered account or not. For example, the telematics server 200 checks whether the telematics service account is an account registered in a database of the user's information or not.

Herein, if the telematics service account is confirmed to be a registered account, the telematics server 200 sends a request for the user's voice sample to the voice recognition service-providing device 100, at the step of S2.

Then, the voice recognition service-providing device 100 transmits the user's voice sample to the telematics server 200 in response to the request of the telematics server 200, at the step of S3.

After that, the telematics server 200 manages the user's voice sample to be corresponding to the user's information. For instance, the telematics server 200 registers the user's voice sample with a voiceprint database, e.g., the storage 230, at the step of S4. Herein, the telematics server 200 may encrypt the user's voice sample and store it in the voiceprint database.

In addition, the telematics server 200 creates a token ID corresponding to the user by referring to the user's voice sample, the user's infirm nation, and the vehicle's information at the step of S5 and transmits the created token ID to the voice recognition service-providing device 100 at the step of S6. The telematics server 200 stores link information according to the created token ID in the storage 230, e.g., a database of link information. When creating the token ID, the telematics server 200 may further refer to information on the voice input device registered for using the voice recognition service. The telematics server 200 may allow the user to recognize information on a result of issuing the token ID by transmitting it to the user's device 120, at the step of S7.

Hereinbefore, the telematics server 200 registered the user's voice sample in response to the link establishing request from the voice recognition service-providing device 100 with the voiceprint database. However, as another example, on condition that the user's voice sample has been pre-registered with the voiceprint database corresponding to the user's information through the user's device 120, etc., the telematics server 200 may perform user authentication by confirming that the voice sample acquired from the voice recognition service-providing device 100 is identical to the user's voice sample registered with the voiceprint database and then the token ID may be created only for the authenticated user.

Figure 4:
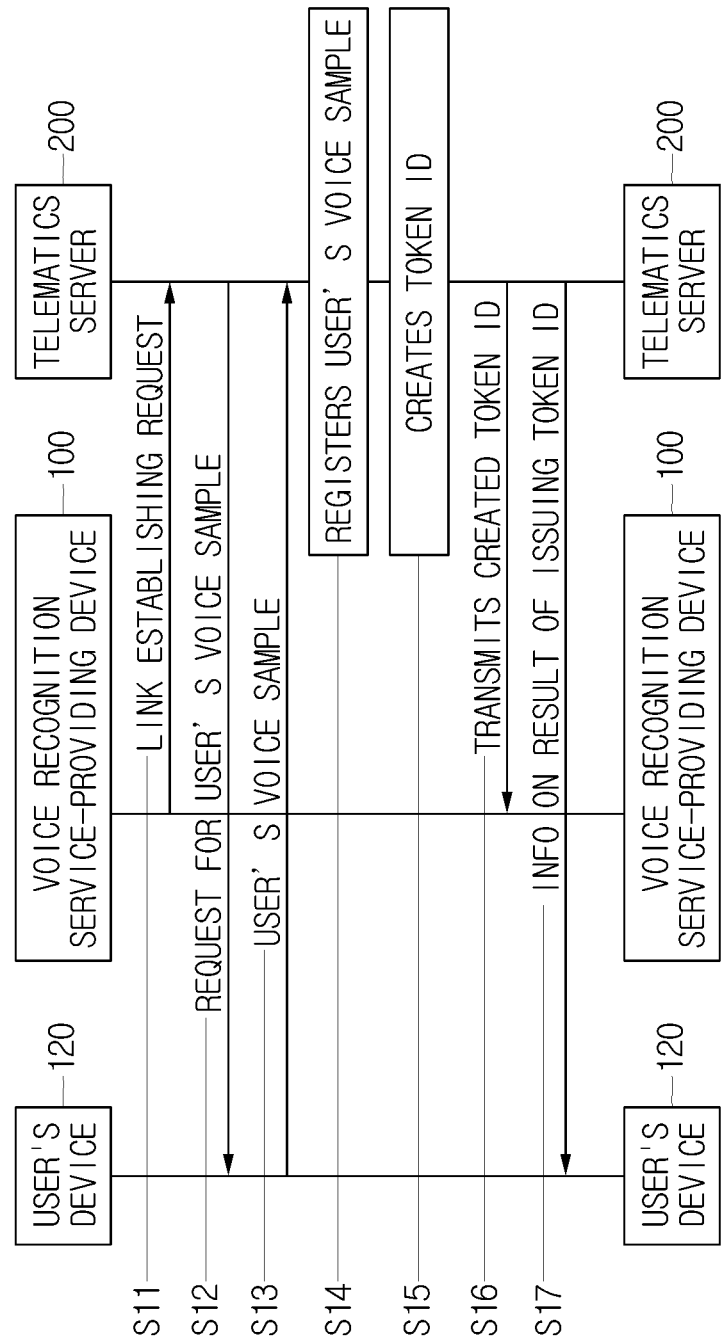

Next, explanation will be made on another method for linking user's accounts between the voice recognition service-providing device and the telematics server in accordance with one example embodiment of the present invention by referring to FIG. 4.

To allow a user of the voice recognition service to use the telematics service, the voice recognition service-providing device 100 sends a link establishing request to the telematics server 200 to link the voice recognition service account of the user with the telematics service account thereof, at the step of S11. Herein, the voice recognition service-providing device 100 may transmit a link establishing request to the telematics server 200 to link with the voice recognition service account by using information on the user's telematics service account.

Then, the telematics server 200 checks whether the telematics service account is a registered account or not. For example, the telematics server 200 checks whether the telematics service account is an account registered with a database of the user's information or not.

Herein, if the telematics service account is confirmed to be the registered account, the telematics server 200 sends a request for the user's voice sample to a user's device 120, at the step of S12.

The user's device 120 transmits, to the telematics server 200, the user's voice sample in response to the request of the telematics server 200. Herein, the user's voice sample may correspond to the voice of the user inputted through the user's device 120, at the step of S13.

After that, the telematics server 200 manages the user's voice sample to be corresponding to the user's information. For instance, the telematics server 200 registers the user's voice sample with a voiceprint database, e.g., the storage 230, at the step of S14. Herein, the telematics server 200 may encrypt the user's voice sample and store it in the voiceprint database.

The telematics server 200 creates a token ID corresponding to the user by referring to the user's voice sample, the user's information, and the vehicle's information at the step of S15 and transmits the created token ID to the voice recognition service-providing device 100 at the step of S16. The telematics server 200 stores link information according to the created token ID in the storage 230, e.g., a database of link information. When creating the token ID, the telematics server 200 may further refer to information on the voice input device registered for using the voice recognition service. The telematics server 200 may allow the user to recognize information on a result of issuing the token ID by transmitting the information to the user's device 120, at the step of S17.

Hereinbefore, the telematics server 200 registered the user's voice sample acquired from the user's device 120 in response to the link establishing request from the voice recognition service-providing device 100 with the voiceprint database. However, as another example, on condition that the user's voice sample has been pre-registered with the voiceprint database corresponding to the user's information through the user's device 120, etc., the telematics server 200 may perform user authentication by confirming that the voice sample acquired from the user's device 120 is identical to the user's voice sample registered with the voiceprint database and then it may create the token ID only for the authenticated user.

Figure 5:
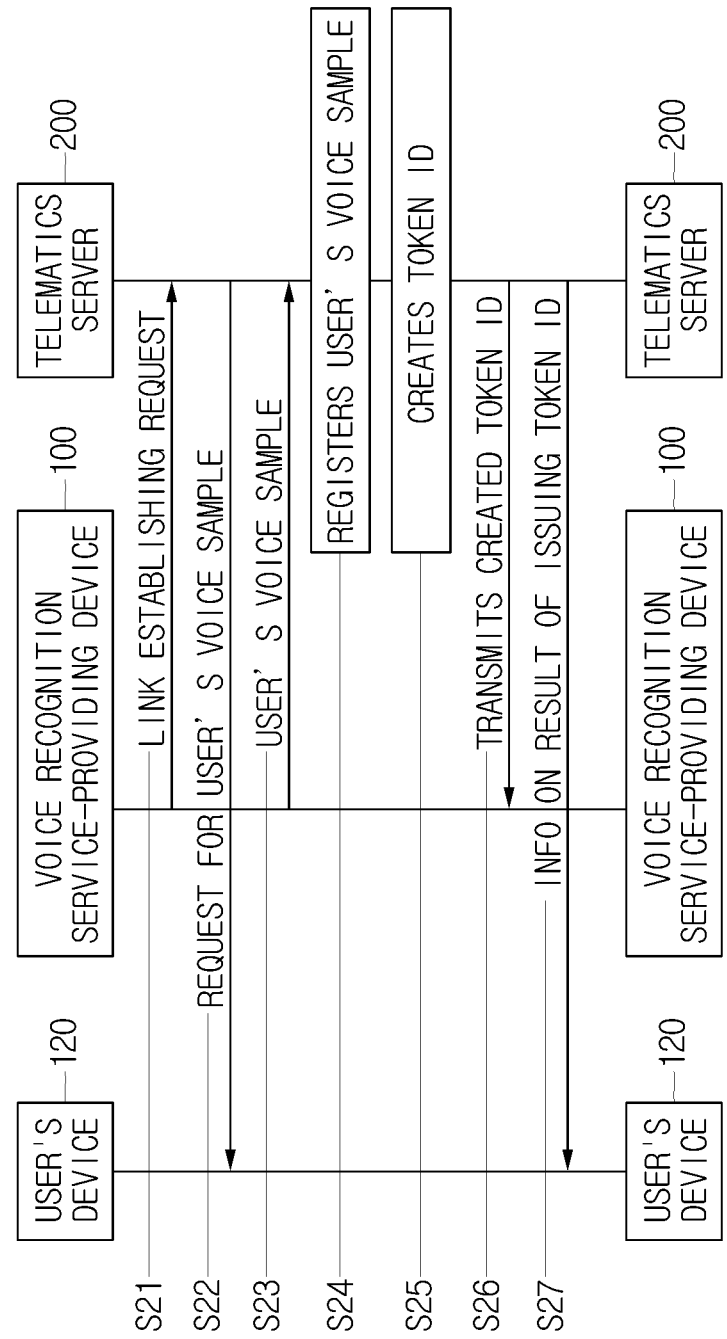

By referring to FIG. 5, still another method for linking user's accounts between the voice recognition service-providing device 100 and the telematics server 200 in accordance with one example embodiment of the present invention will be explained.

To allow a user of the voice recognition service to use the telematics service, the voice recognition service-providing device 100 sends a link establishing request to the telematics server 200 to link the voice recognition service account of the user with the telematics service account thereof, at the step of S21. Herein, the voice recognition service-providing device 100 may transmit a link establishing request to the telematics server 200 to link with the voice recognition service account by using information on the user's telematics service account.

Then, the telematics server 200 checks whether the telematics service account is a registered account or not. For example, the telematics server 200 checks whether the telematics service account is an account registered with a database of the user's information or not.

Herein, if the telematics service account is confirmed to be the registered account, the telematics server 200 sends a request for the user's voice sample to a user's device 120, at the step of S22.

After the user checks the request for the user's voice sample sent from the telematics server 200 through the user's device 120, if the user inputs a voice through the voice input device, the voice recognition service-providing device 100 transmits to the telematics server 200 the user's voice sample that has been transmitted through the voice input device, at the step of S23.

Then, the telematics server 200 manages the user's voice sample to be corresponding to the user's information. For instance, the telematics server 200 registers the user's voice sample with a voiceprint database, e.g., the storage 230, at the step of S24. Herein, the telematics server 200 may encrypt the user's voice sample and store it in the voiceprint database.

The telematics server 200 creates a token ID corresponding to the user by referring to the user's voice sample, the user's information, and the vehicle's information at the step of S25 and transmits the created token ID to the voice recognition service-providing device 100 at the step of S26. The telematics server 200 stores link information according to the created token ID in the storage 230, e.g., a database of link information. When creating the token ID, the telematics server 200 may further refer to information on the voice input device registered for using the voice recognition service. The telematics server 200 may allow the user to recognize information on a result of issuing the token ID by transmitting the information to the user's device 120, at the step of S27.

Hereinbefore, the telematics server 200 registered the user's voice sample acquired from the voice recognition service-providing device 100 in response to the link establishing request from the voice recognition service-providing device 100 with the voiceprint database. However, as another example, on condition that the user's voice sample has been pre-registered with the voiceprint database corresponding to the user's information through the user's device 120, etc., the telematics server 200 may perform user authentication by confirming that the voice sample acquired from the voice recognition service-providing device 100 is identical to the user's voice sample registered with the voiceprint database and then it may create the token ID only for the authenticated user.

On condition that the user's accounts, i.e., the voice recognition service account and the telematics service account, are linked under the methods as specified in FIGS. 3 to 5, the following explanation on a method for providing the telematics service by using voice recognition in accordance with one example embodiment of the present invention will be made by referring to FIG. 6.

If the user inputs his or her voice command to the voice input device 110 to use the telematics service with the voice command, the voice input device 110 transmits to the voice recognition service-providing device 100 an audio signal converted from a voice inputted by the user, at the step of S101. Herein, the voice input device 110 may be pre-registered in the telematics server 200 to be corresponding to user's information, and the telematics server 200 may limit possible number of voice input devices registered by the user or the voice recognition service-providing device 100 to a pre-specified value. For example, the telematics server 200 may limit the possible number of voice input devices available to the user to prevent a third party from registering an arbitrary voice input device and utilizing the user's telematics service. Furthermore, if a command signal is transmitted from an unregistered voice input device, the telematics server 200 may allow the user to confirm the information by transmitting it to the user's device 120 and this may improve security of the telematics service.

The voice recognition service-providing device 100 confirms an intention of the user who intends to use the telematics service by using an audio signal received from the voice input device 110 and then converts the user's voice command corresponding to the user's intention into a text command signal and transmits the text command signal to the telematics server 200, at the step of S102. For example, the voice recognition service-providing device 100 confirms an operation of a vehicle that the user intends to control and transmits to the telematics server 200 the text command signal for the control of the vehicle to allow the vehicle to be operated as confirmed.

Herein, the voice recognition service-providing device 100 may transmit not only the text command but also the user's voice sample to the telematics server 200. Besides, the voice recognition service-providing device 100 may also transmit the token ID acquired by the link between the above-mentioned accounts to the telematics server 200 at the same time.

Then, the telematics server 200 may acquire and analyze the user's voice sample received from the voice recognition service-providing device 100 and check whether the user's voice sample satisfies at least one preset condition, at the step of S103.

For instance, the telematics server 200 checks the user's telematics service account by referring to the token ID received from the voice recognition service-providing device 100, and analyzes whether the user's voice sample on the user's telematics service account registered with the voiceprint database matches the user's voice sample acquired from the voice recognition service-providing device 100 to thereby check whether the user's voice sample acquired from the voice recognition service-providing device 100 is valid.

If the user's voice sample acquired from the voice recognition service-providing device 100 satisfies the at least one preset condition, i.e., if the user's voice sample is confirmed to be valid, the telematics server 200 checks information on the vehicle registered to the user's telematics service account corresponding to the token ID, and transmits to the telematics device 300 placed in the vehicle a command signal for executing a telematics API corresponding to the text command signal acquired from the voice recognition service-providing device 100 to allow the telematics device 300 to execute the telematics API, at the step of S104. Herein, the telematics server 200 may transmit the telematics API registered with a database of telematics APIs to the telematics device 300 placed in the vehicle to allow the telematics device 300 to keep the telematics API for the control of the vehicle up-to-date or to perform a control operation for a new service.

As the telematics device 300 runs the telematics API corresponding to the text command signal, the vehicle is controlled according to the user's intention.

The telematics server 200 acquires result information corresponding to an operational state of the vehicle controlled by the telematics device 300 from the telematics device 300 at the step of S105, and registers the acquired result information with a database of the vehicle information, e.g., the storage 230, at the step of S106.

In addition, the telematics server 200 transmits the result information to the user's device 120 at the step of S170. For example, the result information may be displayed through the user's device 120 or outputted through voice, thereby enabling the user to be aware of the operational state of the vehicle. Herein, the telematics server 200 may transmit the result information to the voice recognition service-providing device 100 to support the voice recognition service-providing device 100 to output the result information through the voice input device 110.

In case the telematics service is provided by using the voice recognition under the method as shown above, the telematics server 200 may register, with the storage 230, a user's usage pattern with respect to location information of the voice input device 110 and the text command signal. If the pattern of the text command signal acquired from the voice recognition service-providing device 100 is different from the user's pre-registered usage pattern, the telematics server 200 may limit the use of the telematics service.

As an example, on condition that the user's usage pattern is registered in such a way that a location of a specific voice input device 110 which acquires a voice input to start a vehicle is designated as a user's home, if a command signal for starting the vehicle is transmitted from an abnormal voice input device whose location is not the user's home, the telematics server 200 may limit the use of the telematics service by determining the situation as a theft or a fraudulent use or transmits a fact that the abnormal voice input device was detected to the user's device 120. Besides, in case the user's voice command for starting the vehicle is different from the previous one, the telematics server 200 may limit an access to the telematics service by determining it as an attempt of a third party to access the telematics service or transmits a fact that the attempt of the third party was detected to the user's device 120.

In addition to this, the telematics server 200 may register a user's usage pattern with respect to location information of the voice input device and that of the vehicle at the time when the text command signal is acquired from the voice recognition service-providing device 100. If the text command signal acquired with a pattern different from the registered usage pattern is detected, the telematics server 200 limits the access to the telematics service or transmits a fact that the different pattern was detected to the user's device 120.

As one example, on condition that the user's usage pattern is registered in such a way that a location of a specific voice input device 110 which acquires a voice input to start a vehicle and that of the vehicle are designated as a user's home, if a command for starting the vehicle is received under a situation that a location of a voice input device or that of the vehicle is not the home, the telematics server 200 may determine the situation as a theft or a fraudulent use. Accordingly, the telematics service 200 may limit the access to the telematics service or allow the user to be aware of the fact through the user's device 120 and this may improve the security of the telematics service.

Furthermore, if a variety of data are stored or registered with the storage 230, the telematics server 200 may encrypt them and then store or register them to protect personal information, etc. instead of storing them directly.

On condition that the user's accounts, i.e., the voice recognition service account and the telematics service account, are linked with each other under the above-mentioned methods as specified in FIGS. 3 to 5, another method for providing the telematics service by using voice recognition in accordance with one example embodiment of the present invention will be explained as shown below by referring to FIG. 7. In the explanation below, parts which are redundant or easily understandable from the explanation under the method specified in FIG. 6 will be omitted.

If a user inputs a voice command to the voice input device 110, the voice input device 110 converts the voice command to an audio signal and then transmits it to the voice recognition service-providing device 100 at the step of S111.

The voice recognition service-providing device 100 checks an intention of the user who intends to use the telematics service by analyzing the audio signal received from the voice input device 110, and converts the user's voice command into the text command and transmits it to the telematics server 200, at the step of S112. Herein, the voice recognition service-providing device 100 may transmit a token ID acquired by the link between the above-mentioned accounts to the telematics server 200 at the same time.

Then, the telematics server 200 checks the user's telematics service account by referring to the token ID and sends a request for a user's voice sample to the user's device 120 registered with the telematics service account, at the step of S113.

If the user's voice sample is transmitted from the user's device 120 at the step of S114, the telematics server 200 acquires and analyzes the user's voice sample received from the user's device 120 and checks whether the user's voice sample satisfies at least one preset condition, at the step of S115.

If the user's voice sample acquired from the user's device 120 satisfies the at least one preset condition, i.e., the user's voice sample is confirmed to be valid, the telematics server 200 checks information on the vehicle registered to be corresponding to the user's telematics service account corresponding to the token ID and transmits to the telematics device 300 placed in the vehicle a command signal for running a telematics API corresponding to the text command signal acquired from the voice recognition service-providing device 100 to allow the telematics device 300 to run the telematics API, at the step of S116.

Then the telematics device 300 lets the vehicle to be controlled according to the user's intention by running the telematics API corresponding to the text command signal.

The telematics server 200 acquires result information corresponding to an operational state of the vehicle controlled by the telematics device 300 from the telematics device 300 of the vehicle at the step of S117 and registers the acquired result information with a database of the vehicle information, e.g., the storage 230, at the step of S118.

In addition, the telematics server 200 transmits the result information to the user's device 120 at the step of S119 to display it through the user's device 120 or to output the result information by voice, thereby enabling the user to be aware of the operational state of the vehicle.

Next, a method for a user entrusting an authority for the telematics service to a sub-user will be explained by referring to FIG. 8 as follows:

If a user with the telematics service account requests a registration of the sub-user who is a third party through the user's device 120 to entrust an authority to access his or her telematics service or give part of the authority to the sub-user, the user's device 120 sends the request for registering the sub-user to the telematics server 200, at the step of S201. As another example, if the user inputs the request for registering the sub-user by a voice command through the voice input device 110, the voice recognition service-providing device 100 transmits a text command signal converted from the voice command to the telematics server 200.

Then, the telematics server 200 sends a request for the sub-user's voice sample to the user's device 120 or the sub-user's device 130 in response to the request for registering the sub-user acquired from the user's device 120 or the voice recognition service-providing device 100, at the step of S202.

If the sub-user transmits his or her voice sample through the user's device 120 or the sub-user's device 130 at the step of S203, the telematics server 200 acquires the sub-user's voice sample and sends a request for the user's voice sample to the user's device 120 or the voice recognition service-providing device 100 at the step of S204.

Then, the user inputs the user's voice sample through the user's device 120 or through the voice input device 110. Accordingly, the voice recognition service-providing device 100 linked with the user's device 120 or the voice input device 110 transmits the user's voice sample to the telematics server 200, at the step of S205.

Thereafter, the telematics server 200 performs user authentication by checking whether the acquired user's voice sample is valid, at the step of S206. In other words, the telematics server 200 checks whether the acquired user's voice sample is identical to the pre-registered user's voice sample, and if it is identical, the telematics server 200 determines that the user is authenticated.

Besides, the telematics server 200 registers the sub-user's voice sample according to the result that the user's voice sample is confirmed to be valid at the step of S207 and transmits the result to at least one of the user's device 120 and the sub-user's device 130 at the step of S208.

As one example, according to the user authentication, the telematics server 200 registers the sub-user's voice sample to be corresponding to the user's voice sample. Herein, the telematics server 200 may create a sub-token ID of the sub-user by referring to the user's information, the sub-user's information, the user's vehicle information, etc. and then transmit it to the voice recognition service-providing device 100. Accordingly, the sub-user may use the telematics service with respect to the user's vehicle by using the sub-user's voice sample.

In addition, the telematics server 200 may limit an authority to access the telematics service by using the sub-user's voice sample according to at least one condition set by the user.

As one example, the user may limit the sub-user's authority to access the user's own telematics service by day, by the number of times, and by region. As another example, if the user has multiple vehicles, the user may give the sub-user an authority to access only some of the vehicles or if the user uses multiple telematics services, the user may give the authority to access only some of them.

If an operation of the vehicle that violates the at least one condition set by the user while the user's telematics service is being provided by using the sub-user's voice sample, the telematics server 200 may transmit it to the user's device 120 to allow the user to be aware of it.

The present invention may prevent a vehicle from being stolen or being used by a third party because it may check whether or not a user who requests the telematics service has an authority to use it.

Further, the present invention may provide the telematics service with an improved degree of security.

Further, the present invention may improve the degree of security of the telematics service because the telematics service may be controlled per user and device in case the telematics service is provided by linking with the voice recognition device provider.

In accordance with the present invention, if a telematics service linked with a voice recognition device provider is provided, the telematics service may be controlled in a unit of user and device. Therefore, the present invention may improve security of the telematics service.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for providing a telematics service by using voice recognition, comprising steps of:
(a) checking, by a telematics server, under a condition that
    (i) a token ID corresponding to a user,
    (ii) a text command signal converted from a voice command signal of the user is input to a voice input device to control a vehicle, and
    (iii) a voice sample of a voice of the user for user authentication corresponding to the voice command signal of the user is acquired from a voice recognition service-providing server, wherein a pre-registered voice sample of the user corresponding to the token ID being from a voiceprint database, and
analyzing, by the telematics server, whether the voice sample of the voice of the user acquired from the voice recognition service-providing server matches the pre-registered voice sample of the voice of the user corresponding to the token ID; and
(b) allowing, by the telematics server, under a condition that the voice sample of the voice of the user acquired from the voice recognition service-providing server matches the pre-registered voice sample of the voice of the user, the vehicle to be controlled according to the voice command signal of the user by supporting a telematics device disposed in the vehicle to run a telematics API corresponding to the text command signal, wherein, the text command signal is converted from the voice command signal of the user by the voice recognition service-providing server, after confirming, by the voice recognition service-providing server, an intention of the user to use the telematics service by the voice command signal of the user received from the voice input device, and wherein the telematics server (i) registers a pattern corresponding to location information of the voice input device and that of the vehicle at a time of acquiring the text command signal from the voice recognition service-providing device, and (ii) under a condition the text command signal with a pattern different from the registered pattern is detected, limits control of the vehicle by the text command signal.

2. The method of claim 1, before the step of (a), further comprising steps of:
(a01) sending, by the telematics server after a link establishing request is received from the voice recognition service-providing device, a request for the voice sample of the voice of the user to the voice recognition service-providing device and acquiring, by said telematics server, the voice sample of the voice of the user therefrom; and
(a02) creating, by the telematics server managing the acquired voice sample of the voice of the user to correspond to information of the user, the token ID corresponding to the user by referring to the voice sample of the voice of the user, the information of the user, and information of the vehicle and transmitting, by said telematics server, the created token ID to the voice recognition service-providing device.

3. The method of claim 1, before the step of (a), further comprising steps of:
(a03) sending, by the telematics server after a link establishing request is received from the voice recognition service-providing device, a request for the voice sample of the user to a device of the user and acquiring, by said telematics server, the voice sample of the voice of the user therefrom; and
(a04) creating, by the telematics server managing the acquired voice sample of the voice of the user to correspond to the information of the user, the token ID corresponding to the user by referring to the voice sample of the voice of the user, the information of the user, and information of the vehicle and transmitting, by said telematics server, the created token ID to the voice recognition service-providing device.

4. The method of claim 1, before the step of (a), further comprising steps of:
(a05) sending, by the telematics server under a condition a link establishing request is received from the voice recognition service-providing device, the request for the voice sample of the voice of the user to the user's device and acquiring, by the telematics server, the voice sample of the voice of the user from the voice recognition service-providing device; and
(a06) creating, by the telematics server managing the acquired voice sample of the voice of the user to be corresponding to the information of the user, a token ID corresponding to the user by referring to the voice sample of the voice of the user, the information of the user, and the information of the vehicle and transmitting, by said telematics server, the created token ID to the voice recognition service-providing device.

5. The method of claim 1, further comprising steps of:
(c) sending, by the telematics server under a condition that a request for registering a sub-user who is authorized by the user to utilize the telematics service of the user is received from the voice recognition service-providing device or the user's device, the request for the sub-user's voice sample to at least one of the voice recognition service-providing devices, the user's device, and the sub-user's device and acquiring, by the telematics server, the sub-user's voice sample therefrom; and
(d) checking, by the telematics server sending the request for the voice sample of the voice of the user to the voice recognition service-providing device or the user's device, and after acquiring it therefrom, whether the voice sample of the voice of the user is valid, and under a condition that the voice sample of the voice of the user is valid, registering the acquired sub-user's voice sample corresponding to the voice sample of the voice of the user and setting and managing an authority to access a telematics service of the sub-user by using the sub-user's voice sample according to at least one condition set by the user;
wherein the steps of (c) and (d) are performed independently of order of the steps (a) and (b).

6. The method of claim 1, wherein, at the step of (a), the telematics server acquires a token ID corresponding to the user from the voice recognition service-providing device, checks the pre-registered voice sample of the voice of the user corresponding to the acquired token ID, analyzes whether the voice sample of the voice of the user acquired from the voice recognition service-providing device matches the pre-registered voice sample of the voice of the user to thereby check whether the voice sample of the voice of the user acquired from the voice recognition service-providing device is valid.

7. The method of claim 1, wherein the telematics server registers information on the voice input device to be corresponding to the information of the user and limits possible number of registration of voice input devices to a pre-specified value.

8. The method of claim 1, wherein the telematics server registers (i) location information of the voice input device and (ii) a usage pattern of the user corresponding to a text command signal from the voice recognition service-providing device converted from the voice command signal of the user inputted from the voice input device and limits use of the telematics service if a pattern of the text command signal acquired from the voice recognition service-providing device is different from the registered usage pattern of the user.

9. A method for providing a telematics service by using voice recognition, comprising steps of:
(a) sending, by a telematics server, under a condition that
(i) a token ID corresponding to a user, and
(ii) a text command signal converted from a voice command signal of the user is input to a voice input device to control a vehicle are acquired from a voice recognition service-providing server,
a request for a voice sample of the voice of the user to the user's device, acquiring, by the telematics server, the voice sample of the voice of the user from the user's device, checking, by the telematics server, a pre-registered voice sample of the voice of the user corresponding to the token ID from a voiceprint database, and then analyzing, by the telematics server, whether the voice sample of the voice of the user acquired from the user's device matches the pre-registered voice sample of the voice of the user corresponding to the token ID; and (b) allowing, by the telematics server, under a condition that the voice sample of the voice of the user acquired from the user's device matches the pre-registered voice sample of the voice of the user corresponding to the token ID, the vehicle to be controlled according to the voice command signal of the user by supporting a telematics device placed in the vehicle to run a telematics API corresponding to the text command signal, wherein, the text command signal is converted from the voice command signal of the user by the voice recognition service-providing server, after confirming, by the voice recognition service-providing server, an intention of the user who intends to use the telematics service by using the voice command signal of the user received from the voice input device, and the telematics server (i) registering a pattern corresponding to location information of the voice input device and that of the vehicle at a time of acquiring the text command signal from the voice recognition service-providing device, and (ii) under a condition the text command signal with a pattern different from the registered pattern is detected, limiting control of the vehicle by the text command signal.

10. A telematics server for providing a telematics service by using voice recognition, comprising:

a communication part for acquiring from a voice recognition service-providing server:

(i) a token ID corresponding to a user, (ii) a text command signal converted from a voice command signal of the user is input to a voice input device to control a vehicle, and (iii) a voice sample of a voice of the user for user authentication corresponding to the voice command signal of the user; and a processor, configured to:

analyze whether the voice sample of the voice of the user acquired from the voice recognition service-providing server matches the pre-registered voice sample of the voice of the user corresponding to the token ID, and allow, under a condition that the voice sample of the voice of the user acquired from the voice recognition service-providing server matches the pre-registered voice sample of the voice of the user corresponding to the token ID, the vehicle to be controlled according to the voice command signal of the user by supporting a telematics device placed in the vehicle to run a telematics API corresponding to the text command signal, wherein the text command signal is converted from the voice command signal of the user by the voice recognition service-providing server after confirming, by the voice recognition service-providing server, an intention of the user to use the telematics service by using the voice command signal of the user received from the voice input device, and the telematics server (i) registers a pattern corresponding to location information of the voice input device and that of the vehicle at a time of acquiring the text command signal from the voice recognition service-providing device, and (ii) under a condition the text command signal with a pattern different from the registered pattern is detected, limits control of the vehicle by the text command signal.

11. The telematics server of claim 10, wherein, under a condition a link establishing request is received from the voice recognition service-providing device, the processor sends a request for the voice sample of the voice of the user to the voice recognition service-providing device, acquires it therefrom, manages the acquired voice sample of the voice of the user to be corresponding to the information of the user, creates a token ID corresponding to the user by referring to the voice sample of the voice of the user, the information of the user, and the information of the vehicle and transmits the created token ID to the voice recognition service-providing device.

12. The telematics server of claim 10, wherein, under a condition a link establishing request is received from the voice recognition service-providing device, the processor sends the request for the voice sample of the voice of the user to a user's device, acquires it therefrom, manages the acquired voice sample of the voice of the user to be corresponding to the information of the user, creates a token ID corresponding to the user by referring to the voice sample of the voice of the user, the information of the user, and the information of the vehicle and transmits the created token ID to the voice recognition service-providing device.

13. The telematics server of claim 10, wherein, under a condition a link establishing request is received from the voice recognition service-providing device, the processor sends the request the voice sample of the voice of the user to the user's device, acquires it from the voice recognition service-providing device, manages the acquired voice sample of the voice of the user to be corresponding to the information of the user, creates a token ID corresponding to the user by referring to the voice sample of the voice of the user, the information of the user, and the information of the vehicle and transmits the created token ID to the voice recognition service-providing device.

14. The telematics server of claim 10, wherein, under a condition a request for registering a sub-user who is authorized by the user to utilize the user's telematics service is received from the voice recognition service-providing device or the user's device, the processor sends the request for the sub-user's voice sample to at least one of the voice recognition service-providing devices, the user's device, and the sub-user's device, acquires it therefrom, sends the request for the voice sample of the voice of the user to the voice recognition service-providing device or the user's device, checks whether the voice sample of the voice of the user is valid after acquiring it therefrom, registers the acquired sub-user's voice sample corresponding to the voice sample of the voice of the user if the voice sample of the voice of the user is valid, and sets and manages an authority to access the sub-user's telematics service by using the sub-user's voice sample according to at least one condition set by the user.

15. The telematics server of claim 10, wherein the processor acquires a token ID corresponding to the user from the voice recognition service-providing device, checks the pre-registered voice sample of the voice of the user corresponding to the acquired token ID, analyzes whether the voice sample of the voice of the user acquired from the voice recognition service-providing device matches the pre-registered voice sample of the voice of the user to thereby check whether the voice sample of the voice of the user acquired from the voice recognition service-providing device is valid.

16. The telematics server of claim 10, wherein the processor registers information on the voice input device to be corresponding to the information of the user and limits possible number of registration of voice input devices to a pre-specified value.

17. The telematics server of claim 10, wherein the processor (i) registers a pattern corresponding to location information of the voice input device and that of the vehicle at a time of acquiring the text command signal from the voice recognition service-providing device, and (ii) under a condition a fact that the text command signal with a pattern different from the registered pattern is detected, transmits information on the fact to the user's device.

18. A telematics server for providing a telematics service by using voice recognition, comprising:
   a communication part for acquiring from a voice recognition service-providing server:
     (i) a token ID corresponding to a user and
     (ii) a text command signal converted from a voice command signal of the user is input to a voice input device to control a vehicle; and
   a processor for:
     sending a request for the voice sample of the voice of the user to the user's device,
     acquiring the voice sample of the voice of the user therefrom,
     checking a pre-registered voice sample of the voice of the user corresponding to the token ID from a voiceprint database, and then
     analyzing whether the voice sample of the voice of the user acquired from the user's device matches the pre-registered voice sample of the voice of the user corresponding to the token ID, and
     allowing the vehicle to be controlled according to the voice command signal of the user, under a condition that the voice sample of the voice of the user acquired from the user's device matches the pre-registered voice sample of the voice of the user corresponding to the token ID, by supporting a telematics device placed in the vehicle to run a telematics API corresponding to the text command signal,
   wherein the text command signal is converted from the voice command signal of the user by the voice recognition service-providing server after confirming, by the voice recognition service-providing server, an intention of the user to use the telematics service by using the voice command signal of the user received from the voice input device, and
   the telematics server (i) registering a pattern corresponding to location information of the voice input device and that of the vehicle at a time of acquiring the text command signal from the voice recognition service-providing device, and (ii) under a condition the text command signal with a pattern different from the registered pattern is detected, limiting control of the vehicle by the text command signal.

\* \* \* \* \*